Feb. 11, 1958   C. M. SMITH   2,823,059
KNOTTER FOR HAY BALERS
Filed May 11, 1956   4 Sheets-Sheet 1

C M Smith
INVENTOR.

BY *Clarence A. O'Brien*
*and Harvey B. Jacobson*
Attorneys

Feb. 11, 1958

C. M. SMITH 2,823,059

KNOTTER FOR HAY BALERS

Filed May 11, 1956

C M Smith
INVENTOR.

Feb. 11, 1958     C. M. SMITH     2,823,059
KNOTTER FOR HAY BALERS

Filed May 11, 1956     4 Sheets-Sheet 3

C M Smith
INVENTOR.

United States Patent Office 2,823,059
Patented Feb. 11, 1958

2,823,059

KNOTTER FOR HAY BALERS

C M Smith, Yadkinville, N. C., assignor of fifty percent to Sidney W. Hutchens, Yadkinville, N. C.

Application May 11, 1956, Serial No. 584,271

9 Claims. (Cl. 289—10)

This invention comprises a novel and useful knotter for hay balers and more particularly relates to a baler knot tyer having a simplified construction with a more efficient and greatly improved operation.

The primary object of this invention is to provide a twine knotter for hay balers which will have a considerably improved structure with a more advantageous operation for tensioning the twine in which the knot is formed.

Another important purpose of the invention is to provide a twine knotter wherein the necessity for adjusting the tension on the bill hook is satisfactorily eliminated; and wherein the bill hook may be yieldably and resiliently closed for an appropriate portion of its rotation during its cycle of operation.

A further object of the invention is to provide a device in accordance with the foregoing object which will eliminate the necessity for adjustment of the tension on the trigger and whereby there will be secured an evenness of tension on all three blades of a trigger mechanism with no tendency of the twine to slide off of the same.

A further object of the invention is to improve the holding action of the twine holder through an increase in the number of and a more satisfactory positioning of the notches in the holder plates, thereby giving a better disposition of the twine strands relative to the bill hook.

Yet another object of the invention is to provide a twine knotter in conformance wtih the preceding objects wherein there may be effected a great decrease in the wear of the mechanism due to a reduction in the number of parts and in the tendency of the parts of the mechanism to get out of line during their operation and a reduction in the strains imposed on the bearings in the driving mechanism of the holder plate assembly.

A still further object of the invention is to provide a twine knotter having a stationary resilient abutment plate coacting with the bill hook for yieldingly closing the bill hook jaws with a fixed, yieldable tension.

An additional object is to devise a twine knotter having an improved bill hook assembly including a stationary rigid cam for opening the bill hook and a resilient abutment for yieldingly closing the bill hook, all in properly timed relation during rotation of the bill hook.

A further object is to provide a twine knotter in conformity with the foregoing objects which shall have a resilient abutment plate for coaction with the trigger and the trigger assembly for imparting a fixed, yieldable holding pressure upon the trigger assembly.

And a very important object of the invention is to provide a twine knotting device as set forth in the preceding objects which shall have a greatly improved driving means for the bill hook and the holder of the knotter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The present invention relates to a twine knotter mechanism similar to those of a conventional type and which is adapted to be mounted upon and operated in association with any conventional type of hay baler, not shown. For this purpose, the usual twine knotter actuating shaft 10 with which the hay baler assembly is customarily provided together with the conventional driving mechanism therefor, is utilized, and the customary main cam of the knotter assembly is replaced by a modified construction of main cam 12 in accordance with the present invention. There is further provided an additional cam disk 14 forming part of a new driving mechanism for operating the twine holder assembly of this invention.

Figure 1:
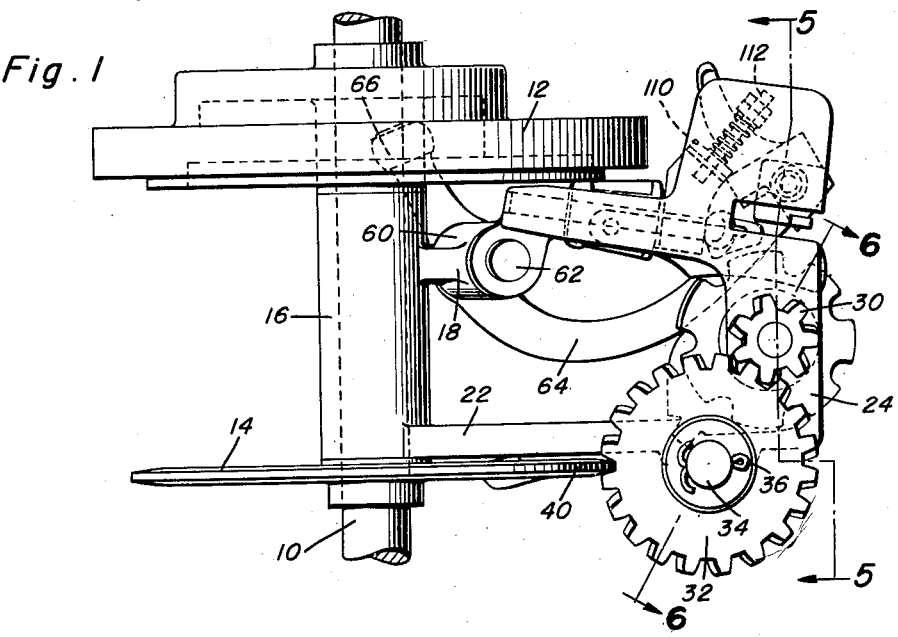
Figure 1 is a view in horizontal plan showing the improved twine knotter incorporating therein the principles of this invention, the position of certain concealed parts being shown in dotted lines therein.
Figure 4:
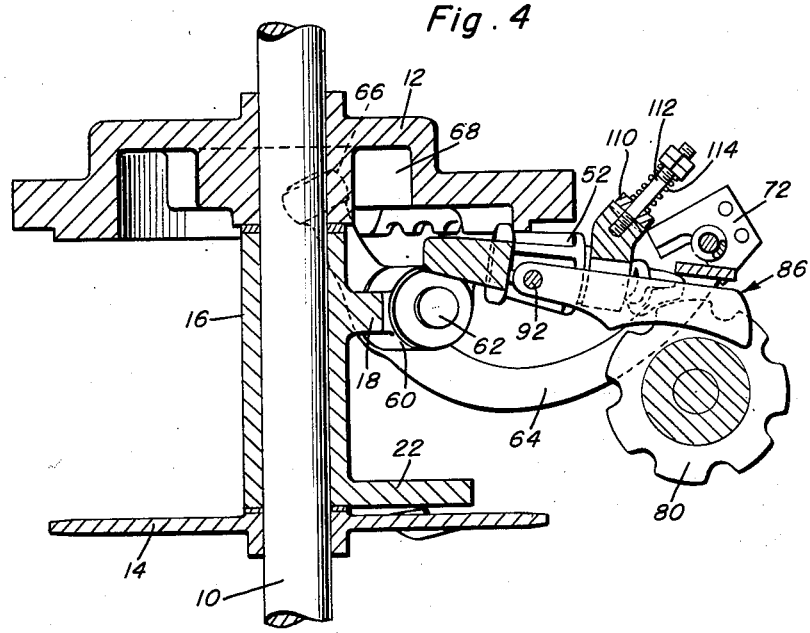
Figure 4 is a horizontal sectional detail taken substantially upon the plane indicated by the section line 4—4 of Figure 2.
Figure 10:
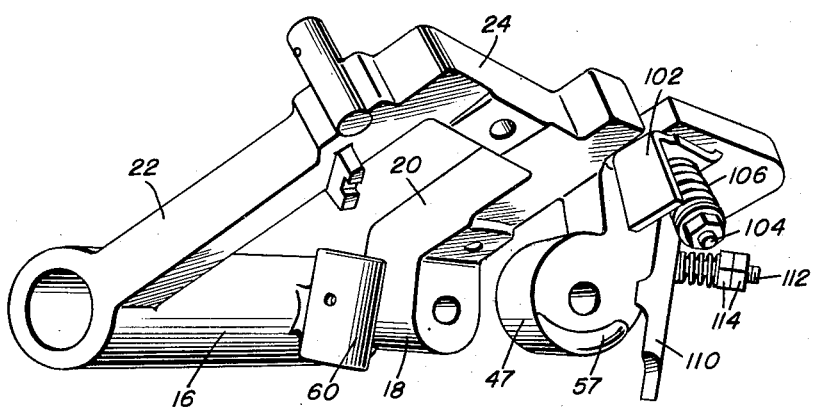
Figure 10 is a perspective view of the frame of the knotter, from the underside, with the moving elements removed therefrom.

As will be more readily apparent from Figures 1 and 4, and in Figure 10 which shows the knotter frame, a bushing or sleeve 16 is freely journaled upon the shaft 10 between the main cam 12 and the holder assembly cam 14. Carried by the sleeve 16 is a substantially U-shaped horizontally disposed supporting frame, see Figures 1 and 10, which consists of a pair of radially projecting arms 20 and 22 which are joined across their outer end by the frame portion 24. The arm 20 has an offset portion 18 by which it is connected to the sleeve 16. This supporting frame 20, 22 and 24 serves to journal and support the holder assembly, the bill hook, the trigger assembly, the knife assembly and their operating mechanisms, comprising the various elements of the twine knotter, in a manner to now be described.

*Holder assembly and drive*

Figure 5:
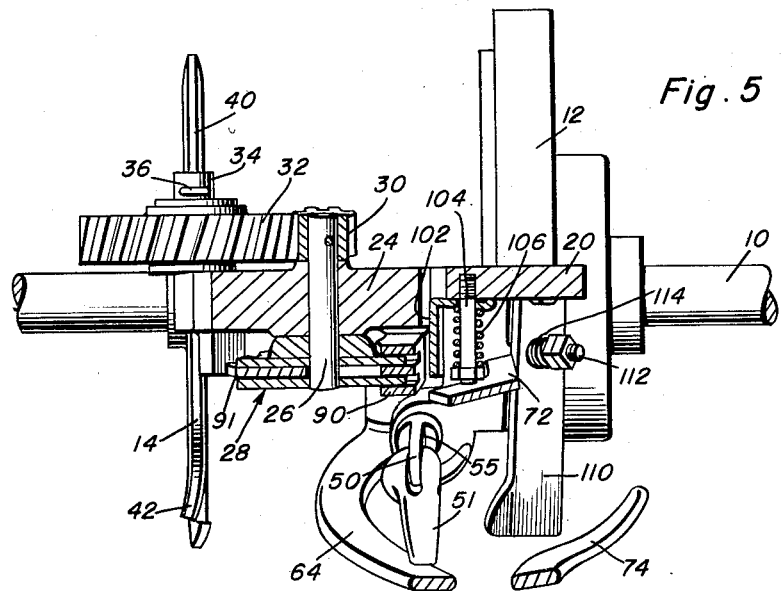
Figure 5 is a vertical transverse sectional view taken substantially upon the plane indicated by the section line 5—5 of Figure 1.
Figure 6:
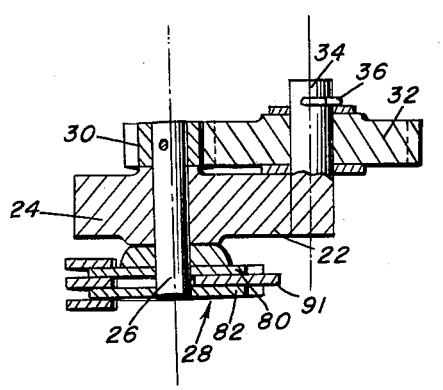
Figure 6 is a vertical sectional view taken substantially upon the plane indicated by the section line 6—6 of Figure 1.

Journaled in the supporting flange portion 24 is a vertical shaft 26 upon which the knotter holder indicated generally by the numeral 28 is fixed for rotation, a helical gear 30 being secured to the upper end of the holder shaft 26 above the frame member 24 as will be best apparent from Figures 5 and 6. Meshing with the gear 30 for driving the same is a further helical gear 32, which is mounted upon a vertical stub axle or shaft 34 fixedly carried by and rising from the arm 22 adjacent its junction with the frame portion 24, with a cotter pin or the like 36 being provided to detachably secure the gear 32 upon this stub axle.

Figure 3:
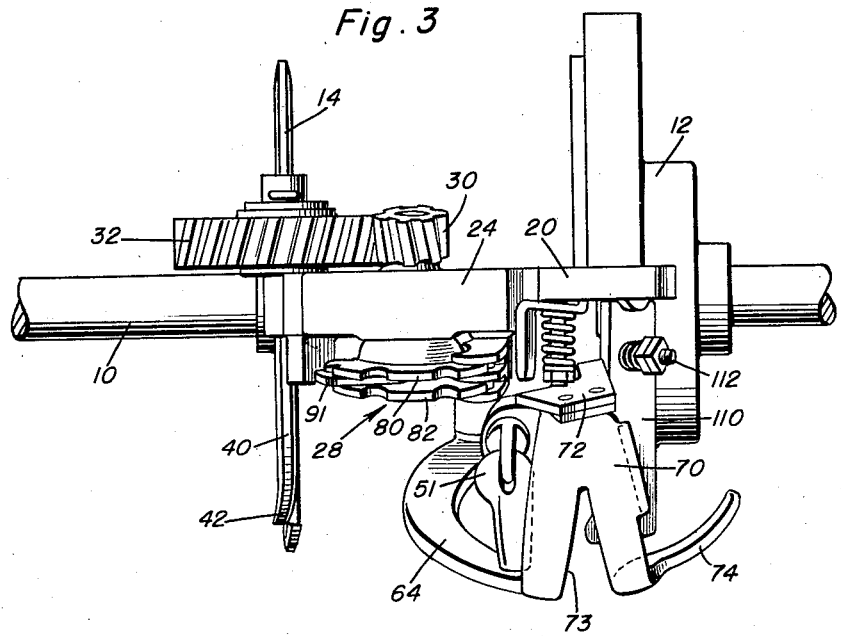
Figure 3 is an end elevational view of the structure in Figure 1, taken from the right end of the same.
Figure 7:
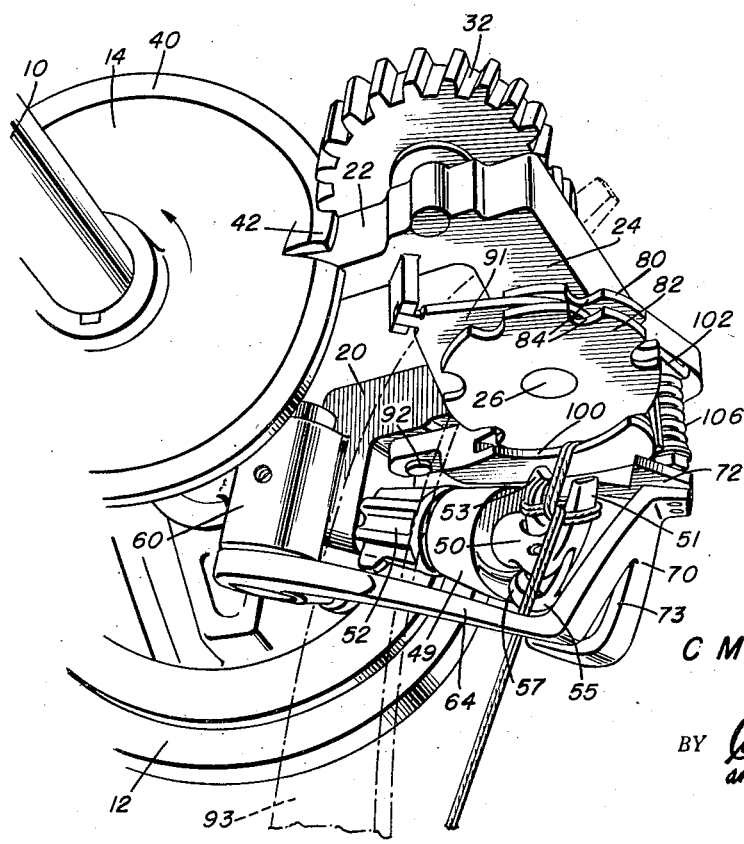
Figure 7 is a perspective view illustrating the manner in which the various elements of this assembly cooperate in the forming of a knot, the position of the baler needle being shown in dotted lines therein.

As will be best apparent from Figures 1 and 7, the holder assembly cam 14 is in the form of a disk having a peripheral rib or edge 40 which is received between and meshes with the teeth of the helical gear 32 for driving the same. The rib 40 is provided with a laterally offset portion 42, see Figures 3, 5 and 7, this offset portion being equal to the width between or spacing between the teeth on the gear 32, so that once each revolution of the continuously rotating holder assembly cam 14, the offset tooth portion 42 will cause the gear 32 to advance circumferentially one tooth, thereby driving the holder shaft 26. The gear 32 through the gear 30 imparts a step-by-step motion to the holder plate shaft 26, for a purpose to be subsequently apparent. A very important feature of the present invention is the above mentioned driving mechanism by which the holder assembly cam 14 imparts rotation to the holder assembly 28, this constituting an improvement over the driving mechanism of the conventional twine knotter for hay balers by reducing the number of bearings and shafts in the driving train of the holder assembly thereby reducing wear and resultant lost motion and discrepancies of timing in the operation of the holder assembly.

Referring now especially to Figures 3, 5-7 and 9, it will be seen that the holder plate assembly 28 consists of a pair of spaced upper and lower horizontally disposed holder plates 80 and 82, each fixedly secured to the vertical shaft 26 and each provided with a plurality of peripherally disposed registering notches 84. Between the plates 80, 82 is the conventional stripper member 91, corresponding to the conventional element illustrated at 91 in the patent to Crumb, No. 2,405,688. A trigger member indicated generally by the numeral 86 is provided, the same consisting of an arm 88, apertured as at 90 for journalling with a horizontal swinging movement upon a vertical trigger pivot pin 92, see Figure 7, the trigger member having three parallel spaced blades 94, 96 and 98, between which are received the peripheries of the two holder plates 80 and 82.

Figure 9:
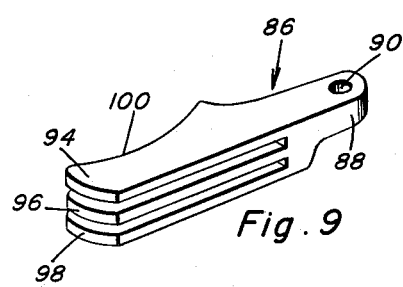
Figure 9 is a perspective view of the trigger element of the knotter.

As will be apparent from Figures 7 and 9, each of the trigger blades is provided with a concaved surface 100 which curved surfaces support the strands of twine as they are clamped between the slide upon the trigger blades as they are held in the notches of the holder plates.

An L-shaped abutment in the form of a bracket 102 is secured to the underside of the frame member 20, as by a fastening bolt 104, a spring 106 yieldingly urging the abutment into fixed position. The abutment normally clears the edges of the trigger plates which are opposite to the curved surfaces 100, but acts to resiliently oppose outward swinging of the trigger blades when strands of twine are placed between the latter and the holder plates, whereby to resiliently clamp the trigger blades and twine upon the holder plates, as will be seen in Figure 7.

The notches 84 of the holder plates are so positioned that each time the holder assembly cam 14 advances the gear 32 one tooth, the holder plates will be also advanced whereby to properly position the next notch 84 to receive the twine from the needle, indicated in dotted lines at 93 in Figure 7.

Bill hook assembly

Figure 2:
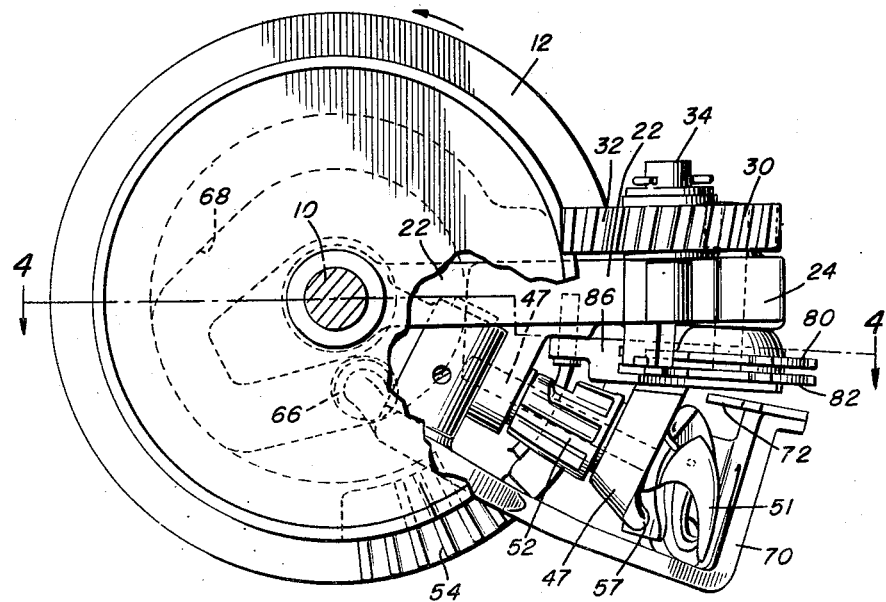
Figure 2 is an end elevational view of the construction of Figure 1, certain parts being broken away, other concealed parts being shown in dotted lines therein.

The bill hook indicated generally by the numeral 50, Figures 2 and 7, is provided with a shaft 47 journaled in a boss 49 depending from the supporting frame offset portion 18, Figure 10, and has fixed and movable jaws 51 and 53. On the bill hook shaft 47 is a gear 52, which as shown best in Figures 2, 4 and 7, is adapted to be engaged by the sector gear 54 formed upon the main cam 12, so that periodically during the rotation of the shaft 10 and the cams 12 and 14 carried thereby, a rotation will be imparted to the bill hook for tying the knot.

The main cam 12 differs from the conventional cam of a conventional knotter assembly in that the usual gear which the conventional knotter mechanism employs to operate the holder plate shaft 26 is omitted therefrom, the previously mentioned cam 14 and drive means 30, 32, and the main cam 12 therefore serve, through the sector gear 54, to drive only the bill hook and to operate a knife member as set forth hereinafter.

Depending from that portion of the support frame upon which the bracket 102 is mounted is a vertically depending bracket 110 which is positioned in the path of travel of the movable jaw 53 of the bill hook, where it can be engaged by the roller 55 of this jaw. A bolt 112 and spring 114 thereon, see Figure 4, yieldably tension the bracket which constitutes a resilient abutment yieldingly urging the movable jaw 53 into closed position during a predetermined portion of the rotation of the bill hook for thereby holding the twine strands during the tying of the knot in the customary mode of operation of bill hooks. The resilient abutment 110, however, provides a yielding tension force applied to the bill hook jaws during only the desired portion of its operation, thereby eliminating the lack of yield in the closing of the bill hook, as occurs in a conventional bill hook assembly such as that of the patent to Crumb, above cited.

A fixed cam surface 57 on the end of the boss 49 serves to actuate the movable jaw 53 to open position at a predetermined portion of the rotation of the bill hook.

Knife blade assembly

Figure 8:
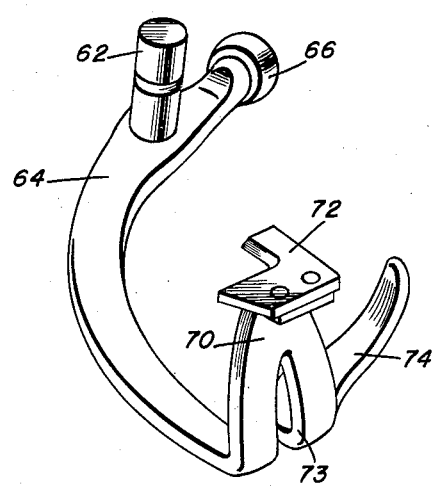
Figure 8 is a perspective view of the cutter blade forming a part of the assembly.

Journaled in a boss 60 on the previously mentioned offset portion 18 of the arm 20, and adjacent the sleeve 16, is a pintle or trunnion 62 provided upon the arcuately extending knife arm 64, see Figure 8, which on one end is provided with an anti-friction roller 66 engageable in a cam groove 68 formed upon the main cam 12, as will be apparent from Figures 1, 2 and 4. At its opposite end, the arm 64 is provided with an upturned portion 70 having thereon a knife blade element 72 and is further provided with a cleft or recess 73. There is also provided a finger 74 curving upwardly from the arm upon the outer side of the recess 73, which finger operates, as set forth hereinafter, to wipe the knot from the bill hook after the twine has been severed by the blade member.

The knife arm 64 is periodically oscillated in proper timed relation to the rotation of the bill hook and the holder assembly, by the cam track 68 to cut the strands after the knot has been made by the bill hook; and the oscillation of the arm causes the wiper finger 74 to brush the knotted strands from the bill hook jaws.

Operation of knotter

The sequence of steps in the operation of this knotter is as follows:

(1) The needle rises, as shown in Figure 7, and deposits the lower strand from the twine disposed in the bale chamber, in which a bale has now been compressed, across the holder plates and into a set of registering notches therein;

(2) The holder assembly cam 14 drives the gearing assembly 32, 30 one tooth thus advancing the holder plates 80, 82 by one notch and thereby bringing the notches into which the strand has been just deposited by the needle under the trigger blades, thereby clamping the twine strand in the holder assembly, also positioning this clamped strand at the bill hook;

(3) The cam gear 54 rotates the bill hook (during which the roller 55 of the movable jaw passes from the jaw opening cam 57 and engages the resilient abutment 110 thereby closing the jaws upon the strands) and ties the knot;

(4) The needle drops to its lower position, leaving the next strand (which will be the strand to the top portion of the baling chamber) in the next notch in the holder assembly;

(5) The cam 12 and its cam groove 68 oscillate the knife arm 64, causing the knife blade to sever the strands and the wiper finger 74 to brush the knot from the bill hook, thereby completing the tying of the knot.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, a resilient abutment on said frame operatively engaging said bill hook during rotation of the latter whereby to resiliently close the bill hook during a predetermined portion of its rotation.

2. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, said cam disk having an annular periphery with an axially offset actuator portion, said gearing having a gear whose teeth are engaged by said periphery, said offset actuator causing step-by-step rotation of said gear upon rotation of said cam disk.

3. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, a trigger cooperating with said twine holder for clamping strands of twine thereto, a resilient abutment member mounted on said frame and operatively associated with said trigger for yieldingly urging the same to clamp strands of twine upon said holder.

4. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, an arm pivotally mounted on said support frame, a member on said arm engaging said drive member for causing oscillation of said arm in timed relation to rotation of said bill hook and holder, a knife on said arm for severing strands of twine after a knot has been tied by said bill hook.

5. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, an arm pivotally mounted on said support frame, a member on said arm engaging said drive member for causing oscillation of said arm in timed relation to rotation of said bill hook and holder, a knife on said arm for severing strands of twine after a knot has been tied by said bill hook, a finger on said arm for wiping the knot off the bill hook when the strands have been severed by said knife.

6. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, a resilient abutment on said frame operatively engaging said bill hook during rotation of the latter whereby to resiliently close the bill hook during a predetermined portion of its rotation, a cam surface on said frame cooperating with said bill hook for opening the latter during other of said predetermined portion of its rotation.

7. A twine knotter including a supporting frame and an actuating shaft operatively associated therewith, a bill hook and a twine holder for holding strands of twine to be tied by said bill hook, said bill hook and twine holder being journaled on said frame, a drive member on said shaft operatively connected to said bill hook for intermittently rotating the latter, a cam disk on said shaft, gearing operatively connecting said cam disk to said twine holder for intermittently rotating the latter in timed relation to rotation of said bill hook, said supporting frame comprising a sleeve journaled on said actuating shaft between said drive member and said cam disk, a U-shaped frame carried by said sleeve and including a pair of arms with a portion extending between the ends of the latter, said twine holder journaled in said portion and said bill hook being carried by one of said arms, one of said arms having an offset member directly attached to said sleeve, said bill hook being journaled in said offset member.

8. The combination of claim 7 including a resilient abutment positioned in the path of travel of said bill hook for resiliently closing the latter in a predetermined portion of its travel.

9. The combination of claim 7 including a knife arm pivotally mounted upon said offset portion and having operative engagement with said drive member for imparting timed oscillation to said knife arm.

References Cited in the file of this patent
UNITED STATES PATENTS

| | | |
|---|---|---|
| 328,918 | Butterfield | Oct. 27, 1885 |
| 345,674 | Cooley | July 20, 1886 |
| 2,723,871 | Rudeen | Nov. 15, 1955 |